US006343659B1

(12) United States Patent
Sexsmith

(10) Patent No.: US 6,343,659 B1
(45) Date of Patent: Feb. 5, 2002

(54) MINI SHRUB SPADER

(76) Inventor: Hugh Sexsmith, 48508 Ryder Lake Road, Chilliwack, British Columbia (CA), V4Z 1E3

( * ) Notice: Subject to any disclaimer, the term of this patent is extended or adjusted under 35 U.S.C. 154(b) by 0 days.

(21) Appl. No.: 09/531,152

(22) Filed: Mar. 17, 2000

(51) Int. Cl.[7] ............................................. A01D 33/00
(52) U.S. Cl. .......................... 171/45; 171/46; 171/141; 111/101; 37/302
(58) Field of Search ..................... 37/302, 303; 171/45, 171/46, 50, 21, 141, 132, 63, 53; 172/684.5; 111/101, 102

(56) References Cited

U.S. PATENT DOCUMENTS

| | | | | |
|---|---|---|---|---|
| 2,652,639 A | * | 9/1953 | Kluckhohn | ................. 111/101 |
| 2,770,076 A | | 11/1956 | Kluckholn | |
| 3,032,123 A | * | 5/1962 | Brown | ........................ 111/101 |
| 3,163,944 A | * | 1/1965 | Whitcomb | .................. 111/101 |
| 3,623,245 A | * | 11/1971 | Adams | ........................ 111/101 |
| 4,271,611 A | * | 6/1981 | Paul | ............................. 111/101 |
| 4,305,213 A | * | 12/1981 | Pelham | ........................ 111/101 |
| 4,332,093 A | * | 6/1982 | Berthollet | .................... 111/101 |
| 4,676,013 A | * | 6/1987 | Endo | ........................... 111/101 |
| 4,903,418 A | * | 2/1990 | Loudon | ................. 111/101 X |
| 4,979,321 A | | 12/1990 | Hall | |
| 5,133,268 A | | 7/1992 | Delisle | |
| 5,762,146 A | | 6/1998 | Andrews | |

* cited by examiner

*Primary Examiner*—Victor Batson
(74) *Attorney, Agent, or Firm*—Hall, Priddy, Myers & Vande Sande

(57) ABSTRACT

A mini shrub spader for unearthing and transporting trees and shrubs. The mini shrub spader has a basketed U-blade which allows it to unearth, shape the root ball and transport a tree or shrub utilizing the same device. The mini shrub spader is preferably mounted to the rear of a small tractor.

11 Claims, 3 Drawing Sheets

MINI SHRUB SPADER

FIELD

This invention relates to a mini shrub spader for unearthing and transporting trees or shrubs.

BACKGROUND OF THE INVENTION

The ability to easily and quickly unearth and transport shrubs and trees is essential to success in the nursery industry. Typically, the devices used to unearth shrubs and trees are large and complex, making them difficult to maneuver in the tight spacing between rows of nursery plants. These large devices are further flawed in that they often do not shape the root ball and may damage the roots and/or trunk resulting in plant mortality. Moreover, once unearthed, typically the plants must be manually transferred to another device to be transported to their ultimate destination.

U.S. Pat. No. 2,770,076 issued Nov. 13, 1956 to Kluckhohn discloses an apparatus for removing and transporting trees comprising a U-shaped cutter mounted onto a front-end loader or similar machine. To remove and transport a tree, the U-shaped cutter is submerged into the earth some distance from the target tree. The U-shaped cutter is advanced towards the target tree until it is directly under the target tree. At this point the boom of the front-end loader, or similar machine, is raised vertically and the target tree, together with the dirt surrounding the roots, is removed from the ground. Due to the size of the apparatus disclosed by Kluckhohn and its method of operation, this apparatus is impractical for use in a nursery. Further, the apparatus disclosed by Kluckhohn does not shape the root ball of the unearthed tree or shrub requiring additional labour and expense. The Kluckhohn device also does not cut through all of the roots resulting in tearing of uncut roots when the target tree is lifted, thus damaging the roots.

U.S. Pat. No. 4,979,321 issued Dec. 25, 1990 to Hall discloses a tree excavator comprising an excavator scoop mounted on the articulating crane arm of a truck. The excavator scoop comprises a plurality of curved segments mounted for movement between a nested position and a deployed position. Again, the size of the tree excavator disclosed by Hall makes it impractical to use within the tight row spacing of a typical nursery.

U.S. Pat. No. 5,133,268 issued Jul. 28, 1992 to Delisle discloses a tree scooper mounted to the standard hydraulically articulated beam of a tractor by way of an H-mount. The tree scooper comprises a scoop with a shovel shaped bottom and two sides. The leading edge of the scoop has angled teeth. The movement of the scoop is powered by four hydraulic cylinders; two hydraulic cylinders mounted internally within the H-mount and two hydraulic cylinders mounted with one on each side of the scoop. To unearth a tree or shrub, the tree scooper combines a rotating and back-sliding action to allow the scoop to travel in a semi-circular path under a tree or shrub. The moderately sized tractor with a standard hydraulically articulated beam required to mount the tree scooper disclosed by Delisle limits the tree scooper's mobility and practicality in the narrow aisles of a nursery. Delisle's tree scooper also suffers from the inability to transport a tree or shrub once unearthed thereby requiring additional time, effort and expense. Moreover, the operation of the tree scooper disclosed by Delisle is complex requiring the user to coordinate the sliding and rotating actions of the tree scooper in order to achieve a satisfactory result.

U.S. Pat. No. 5,762,146 issued Jun. 9, 1998 to Andrews discloses a nursery plant digger designed to remove plants, grown in long parallel rows, from the soil and to remove the soil from the roots. The nursery plants digger comprises a horizontally aligned bar mounted to the rear of a tractor and having a U-shaped scoop mounted to the distal end of the bar. The scoop travels through the soil, slightly under the plant, thereby lifting the plant from the soil. The uprooted plants are transferred to a shaking grate located behind the scoop which shakes the soil free from the roots. The plants are then deposited in the field for easy pickup. The nursery plant digger disclosed by Andrews can not transport the plants once unearthed. Further, Andrews' device removes the soil from the roots of the plants making it inappropriate for use with trees or shrubs that require the root ball remain intact.

It is, therefore, an object of this invention to provide a mini shrub spader capable of unearthing, shaping the root ball of, and transporting a tree or shrub relatively easily and quickly within a nursery environment.

It is a further object of this invention to provide a mini shrub spader which is light in weight and compact in design.

SUMMARY OF THE INVENTION

The mini shrub spader of this invention is constructed of a steel frame which houses the hydraulic systems. The frame is H-shaped having a basketed U-blade pivotally secured to the front of the frame. The U-blade is actuated through two hydraulic cylinders mounted on the top of the frame. The rear of the frame has a three-point hitch to allow the mini shrub spader to be secured to a small tractor or similar towing device. The hydraulic systems of the mini shrub spader are powered through either the external hydraulics or the power transfer outlet of the towing vehicle.

To operate the mini shrub spader to unearth a tree or shrub, first, the basketed U-blade is placed in the pre-digging position adjacent to the target plant to be dug. The basketed U-blade then moves in a semi-circular path, cutting under the target plant and through the bottom portion of its roots, digging it up, shaping the root ball and supporting the target plant, and its root ball, in the basket of the basketed U-blade.

The basketed U-blade of the mini shrub spader may be interchanged with basketed U-blades of various sizes and shapes corresponding to the size and species of plant to be unearthed and transported.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

The invention itself both as to organization and method of operation, as well as additional objects and advantages thereof, will become readily apparent from the following detailed description when read in connection with the accompanying drawings, wherein.

DETAILED DESCRIPTION OF THE INVENTION

Figure 1:
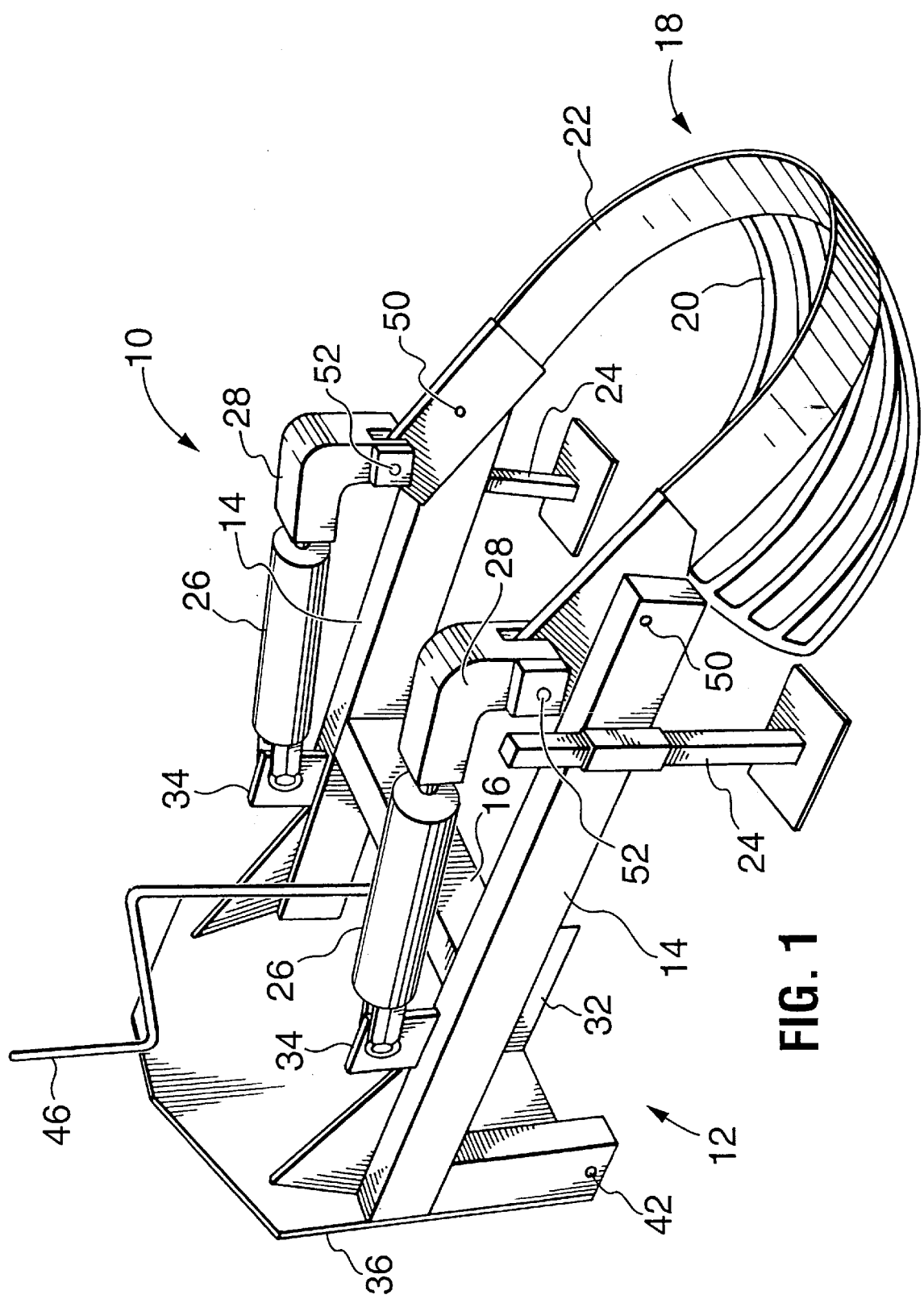
FIG. 1 is a perspective view of the mini shrub spader with the basketed U-blade in the post-digging/transporting position.

Throughout the figures, like elements are indicated by like reference numbers. Referring to FIG. 1, the mini shrub spader 10 includes an H-shaped frame 12 which houses the hydraulic systems 32. Frame 12 is comprised of two parallel frame members 14 and a cross member 16 located between and secured firmly to the frame members 14. Slidably and pivotally mounted to the outside of the frame members 14 are the support legs 24.

The basketed U-blade 18 is pivotally mounted onto the front of frame 12 through pivot 50. The basketed U-blade 18 is comprised of a basket 20 comprising a set of parallel arcuate ribs attached at one end to a rear of a U-shaped blade 22. The leading edge of the blade 22 is sharpened to efficiently cut through the ground under the target plant.

The basketed U-blade 18 is operatively coupled to hydraulic cylinders 26 through elbows 28. At one end, elbows 28 are pivotally coupled to the basketed U-blade 18 at pivots 52 and at the other end, secured to hydraulic cylinders 26. The ends of hydraulic cylinders 26 that are not secured to elbows 28 are pivotally coupled to cylinder mounts 34. Hydraulic cylinders 26 are powered by hydraulic systems 32 which are operatively coupled to a power transfer outlet or external hydraulics of a towing vehicle (not shown) through power transfer conduit 30 (see FIG. 2).

Figure 2:
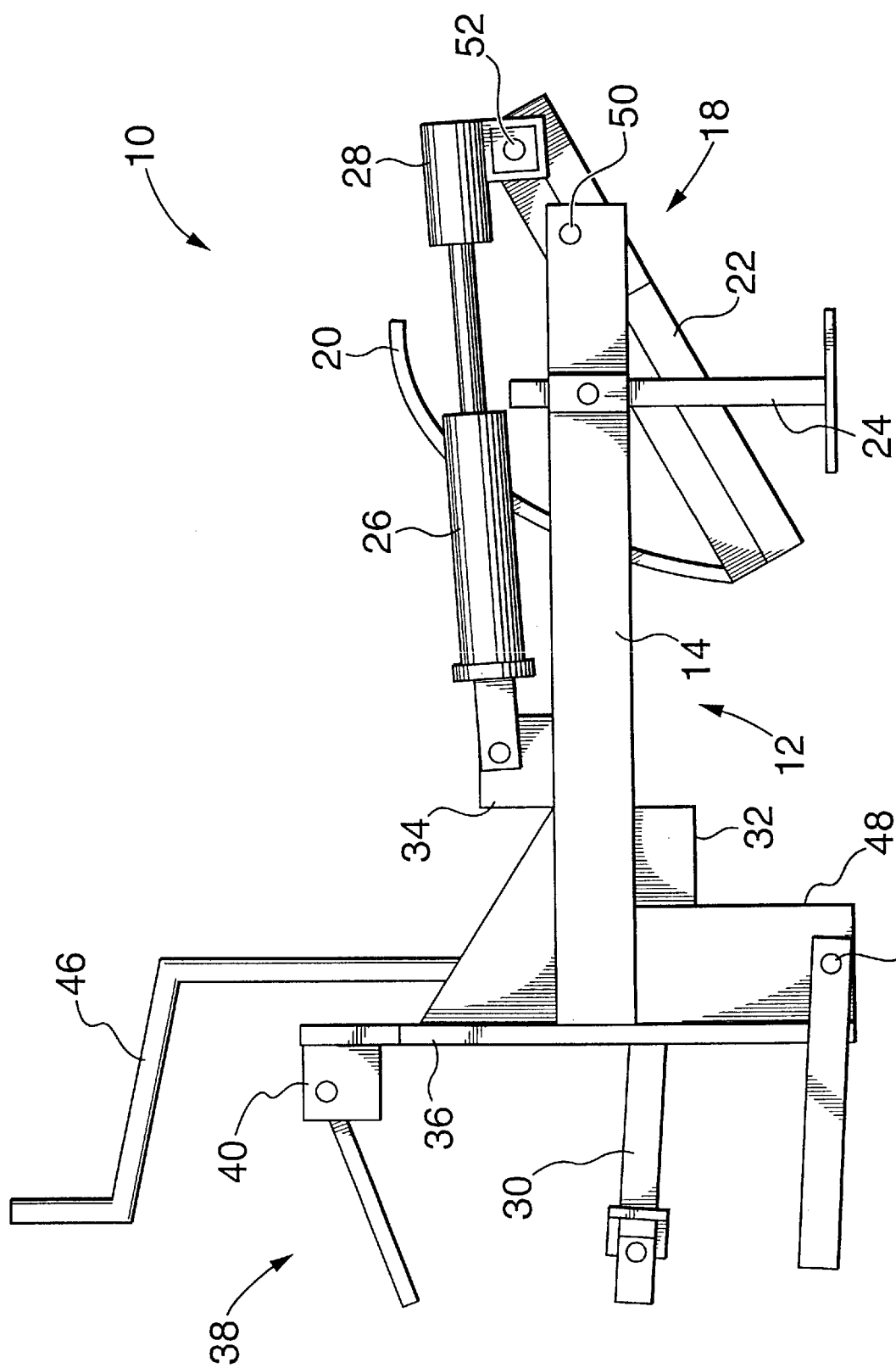
FIG. 2 is a side view of the mini shrub spader with the basketed U-blade in the pre-digging position.
Figure 3:
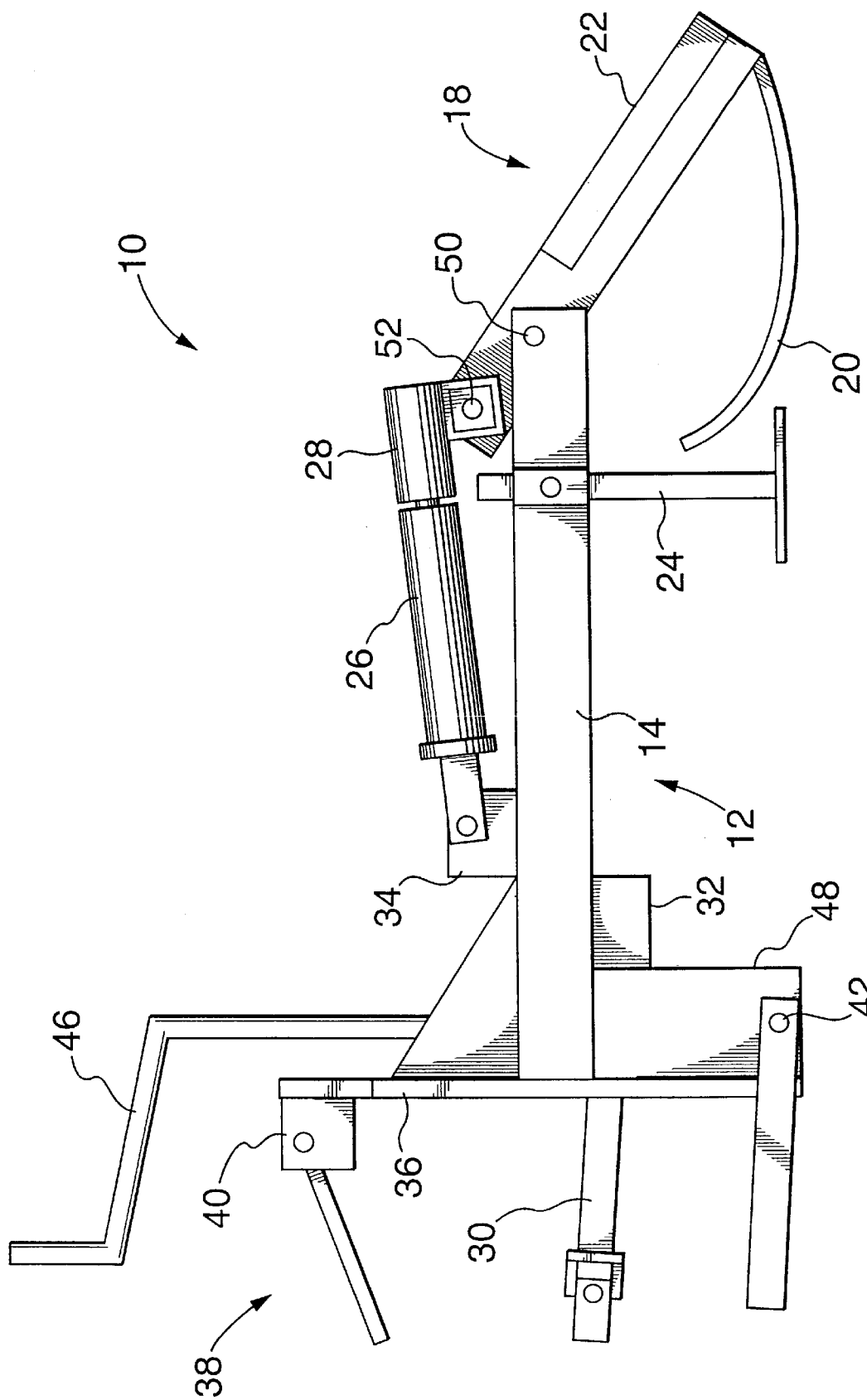
FIG. 3 is a side view of the mini spader with the basketed U-blade in the post-digging/transporting position.

Referring to FIGS. 2 and 3, mounted at the rear of the frame 12 on the underside of frame members 12 are the mounting members 48 with hitch mounts 42. A back plate 36 is mounted onto the rear of the frame 12. Secured to the top of the back plate 36 is the hitch bracket 40. The combination of the hitch bracket 40 and the hitch mounts 42, forms a three-point hitch 38 allowing the mini shrub spader 10 to be mounted onto the rear of a tractor or similar towing vehicle.

In operation, the mini shrub spader 10 is secured to the rear of a tractor or similar towing device through the three-point hitch 38. With the basketed U-blade 18 in the pre-digging position, the towing vehicle is used to position the mini shrub spader 10 adjacent to the target tree or shrub such that the trunk of the target tree or shrub is aligned centrally between the blade pivots 50. Once in position, through control lever 46, the hydraulic cylinders 26 are actuated and the basketed U-blade 18 moves in a semi-circular path, cutting under the tree or shrub, and digging it up until the basketed U-blade 18 reaches the post-digging position (see FIG. 3). The basketed U-blade 18 is designed such that the forward portion of the basket 20 follows the path of the blade 22 under the tree or shrub to minimize disruption of the root ball while the rear portion of basket 20 lifts up the root ball slightly as it passes underneath it. In the post-digging position, the basket 20 of the basketed U-blade 18 supports the root ball of the tree or shrub which can then be easily transported to be wrapped in burlap or placed in another location for planting.

It will be appreciated by those skilled in the art that the mini shrub spader of this invention is distinguished by its versatility, simplicity, and efficiency. Moreover, the design of the mini shrub spader precludes the need for manual labour and a separate device to transport the unearthed tree from the location at which it was unearthed.

Furthermore, it will be understood that the hydraulic cylinders, hydraulic systems, etc. used throughout this invention may be of any desired design according to the knowledge of those skilled in the art and operate in conventional fashion to achieve the intended result. Indeed, the hydraulic cylinders may be replaced with electric or pneumatic equipment, if so desired.

Although the present invention has been described in detail with reference to one preferred embodiment, it will be clearly understood that this is by way of illustration only.

Many variations and alternative embodiments of the invention will now be apparent to those skilled in the art, and are not to be excluded from the scope of the invention, which is to be determined only by the appended claims, as set forth below.

What is claimed is:

1. A mini shrub spader for unearthing and transporting trees or shrubs, comprising:
   a) a frame;
   b) a curved blade having a sharpened forward edge and a rearward edge, pivotally coupled to said frame proximate a front of said frame so as to be reversibly rotatable from a pre-digging position to a post-digging position in which the soil around the tree has been completely cut through by means of pivotal movement of the blade without forward or reverse movement of the frame;
   c) a basket secured to said rearward edge of said curved blade and extending rearwardly therefrom, said basket being shaped arcuately in a direction of movement of said basket and so constructed and positioned in said spader to substantially follow the trajectory of the blade as it is rotated through the soil such that after cutting through the roots of said tree said basket is positioned below said tree roots and supports a ball of said tree; and
   d) an actuator coupled to said frame and to said curved blade and operative to reversibly pivot said curved blade and said basket relative to said frame.

2. The mini shrub spader according to claim 1, wherein said mini shrub spader is coupled to the rear of a towing vehicle through a three-point hitch.

3. The mini shrub spader according to claim 1, wherein the combination of said curved blade and said basket is removable whereby said combination may be replaced with one of a plurality of combinations of said curved blade and said basket, said each combination of said curved blade and said basket having a blade and a basket of a different size and shape.

4. The mini shrub spader according to claim 1, wherein said actuator is a pair of hydraulic cylinders, said pair of hydraulic cylinders coupled to respective sides of said frame and said curved blade, said pair of hydraulic cylinders being operative to reversibly pivot said curved blade.

5. The mini shrub spader according to claim 4, wherein said pair of hydraulic cylinders is powered through a power transfer outlet of said towing vehicle.

6. The mini shrub spader according to claim 4, wherein said pair of hydraulic cylinders is powered through external hydraulics of said towing vehicle.

7. The mini shrub spader according to claim 1, wherein said curved blade is U-shaped.

8. The mini shrub spader according to claim 1, wherein a front portion of said basket sweeps out a surface substantially equivalent to that of said curved blade as said curved blade rotates from said pre-digging position to said post-digging position while a portion behind said front portion of said basket lifts a root ball formed by the rotation of said curved blade.

9. The mini shrub spader according to claim 1, wherein said basket is operative to support one of said trees or shrubs once said curved blade has cut under one of said trees or shrubs.

10. The mini shrub spader according to claim 1, wherein said basket has a plurality of substantially parallel arcuate ribs affixed to a rearward edge of said curved blade and extending rearwardly of said curved blade.

11. A mini shrub spader according to claim 1, wherein said actuator includes a pair of hydraulic cylinders coupled to respective sides of said frame and said curved blade, said pair of hydraulic cylinders being operative to reversibly pivot said curved blade from said pre-digging position to said post-digging position.

* * * * *